March 17, 1936. W. R. KEPLER 2,034,399
CHIME FOR BARRELS AND THE METHOD OF MAKING IT
Filed Aug. 10, 1933 2 Sheets-Sheet 1

INVENTOR.
William R. Kepler
BY
ATTORNEY.

March 17, 1936.  W. R. KEPLER  2,034,399
CHIME FOR BARRELS AND THE METHOD OF MAKING IT
Filed Aug. 10, 1933    2 Sheets-Sheet 2
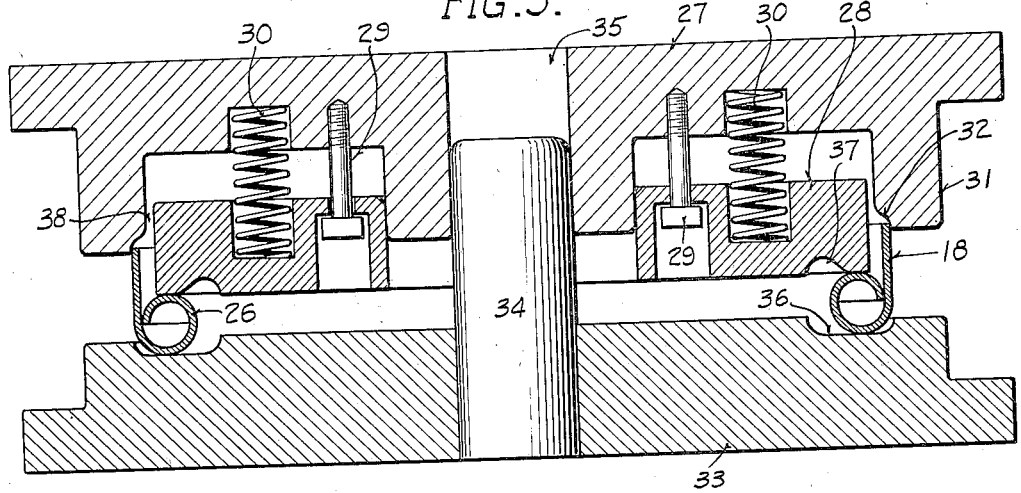
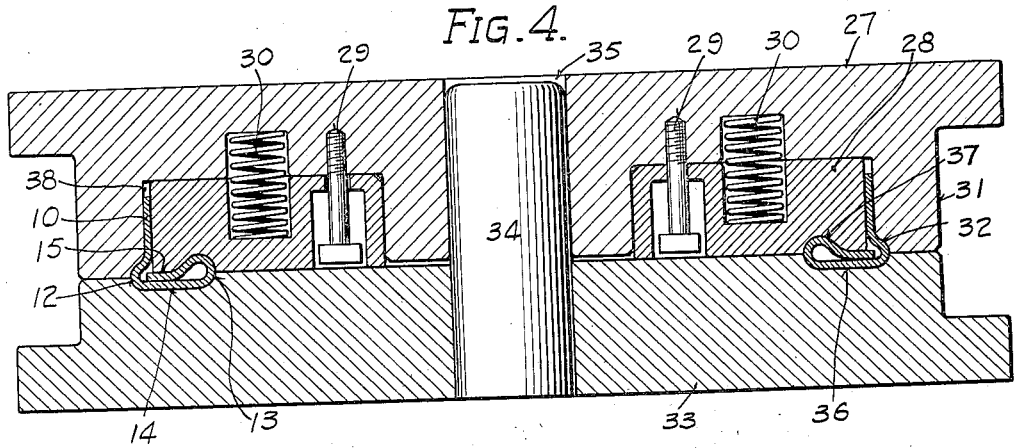
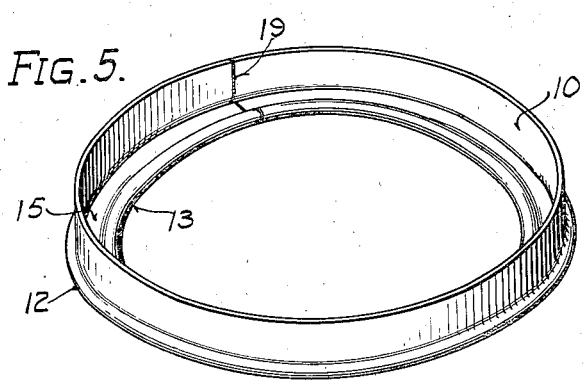
INVENTOR.
William R. Kepler
BY
ATTORNEY.

Patented Mar. 17, 1936

2,034,399

UNITED STATES PATENT OFFICE 2,034,399

CHIME FOR BARRELS AND THE METHOD OF MAKING IT

William R. Kepler, Wauwatosa, Wis., assignor to A. O. Smith Corporation, Milwaukee, Wis., a corporation of New York Application August 10, 1933, Serial No. 684,497

8 Claims. (Cl. 220—69)

The invention relates generally to chimes for barrels and the method of fabricating them.

An object of the invention is to provide a barrel chime having a protecting bead that is resilient and strong and a hand grip portion that is suitable for handling and arranged to reenforce the bead.

It is also an object of the invention to introduce a method of fabricating barrel chimes that is simple to execute and inexpensive in operation.

For a fuller understanding of the nature and objects of the invention, reference may be had to the following detailed description taken in conjunction with the accompanying drawings, in which:

Fig. 3 is a view in vertical section showing a press for performing the second operation in the fabrication of the chime with a partially fabricated chime in position;

Fig. 4 is a vertical section of a press showing the position it stands in after it has been operated to complete the forming of the chime;

Fig. 5 is a perspective view of a chime fabricated in accordance with the teaching of this invention.

Figure 6:
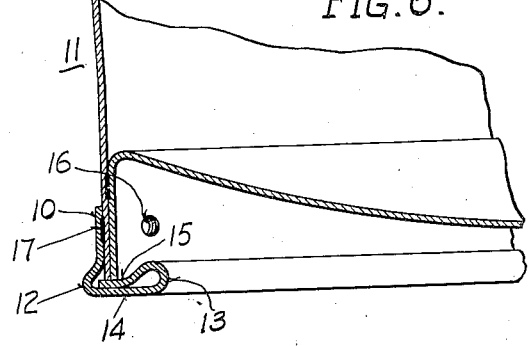
Fig. 6 is a view in vertical section of a portion of a barrel body showing the manner of mounting the chime.

Referring now to the drawings, and Figs. 4, 5, and 6 in particular, the chime comprises a cylindrical shell portion or rim 10 which is of the proper depth and diameter to receive the end of a barrel body 11. The blank from which the cylindrical shell portion is formed is preferably made from sheet steel. The gauge of the metal utilized for fabricating the chime will depend upon the conditions to be met.

At the lower edge of the rim 10 a circumferential bead 12 is formed. This bead extends beyond the cylindrical shell portion or rim 10 and serves as a bumper for protecting the end of the barrel. If a barrel is dropped from a truck or car endwise, this bumper bead 12 will receive the blow.

The strength required for the bumper bead 12 will control the gauge of metal selected for making the chime. In this particular structure, the bumper bead 12 is formed integral with the cylindrical shell portion 10.

A second bead 13 is provided. This bead 13 is opposite the bead 12 and is carefully rounded, as shown in Fig. 6, to provide a hand grip to facilitate the handling of the barrel. As illustrated, the bead 13 extends inwardly, being on the opposite side of the shell portion 10 from the bead 12.

The bead 13 is carried by the bead 12 through the medium of the neck or annular plate 14 with which the beads are integral in this instance. The neck 14 is made long enough to locate the bead 13 well inside of the rim of the barrel body 11. In this manner a hand grip of the proper size is provided. A reenforcing member 15 is provided on the inner bead 13 and extends parallel to the neck or annular plate 14 and is supported thereby. This reenforcing member gives rigidity to the chime and receives the rim on the body 11.

Since the bead 13 is formed integral with the bead 12, it reenforces the latter and gives a very strong rigid structure. Further, the bead 12 is supported by the neck 14.

In order to drain any liquids that may be collected inside of the bead 13 and plate 14, a plurality of drain holes 16 are provided in the chime wall in alignment with corresponding openings provided in the rim of the barrel body 11. As illustrated, these openings 16 extend through the rim of the barrel body 11 and the cylindrical shell portion 10 of the chime at the point where the chime is welded to the end of the barrel body. This does not in any way injure the barrel since the weld between the chime and the rim of the barrel is amply strong to carry the loads that are imposed on it.

As shown in Fig. 6, the rim of the barrel body 11 seats on the reenforcing member 15. Thus if the barrel is dropped on its end, the thrust is taken by the neck 14 and is transmitted along a line extending substantially in line with or parallel to the wall of the barrel body.

In the fabricating of the chime, a cylindrical shell or blank 18 is rolled from steel plate of any suitable thickness. The ends of the plate are welded together as shown at 19. The length of the cylindrical shell or blank 18 will depend on the size of the chime it is desired to fabricate.

The press utilized for performing the first step in the fabricating of the chime comprises a bed member 20 having a circumferential groove 21 for receiving the blank 18. Resting in a seat in the press bed 20 is a ring 22 which cooperates with the groove 21 for retaining the blank in position and preventing its distortion during the pressing operation. As illustrated, the external diameter of the ring 22 is smaller than the internal diameter of the blank 18, thus facilitating the mounting of the blank.

An upper press member or die member 23 which is disposed to slide upwardly and downwardly on a guide pin 24 and to be actuated by mechanism not shown, since it is well known in the art, is provided with a circumferential groove 25. The upper portion of the groove is semi-circular in cross-section. The upper surface of the ring 22 is grooved to cooperate with the groove 25 in forming the chime.

Figure 2:
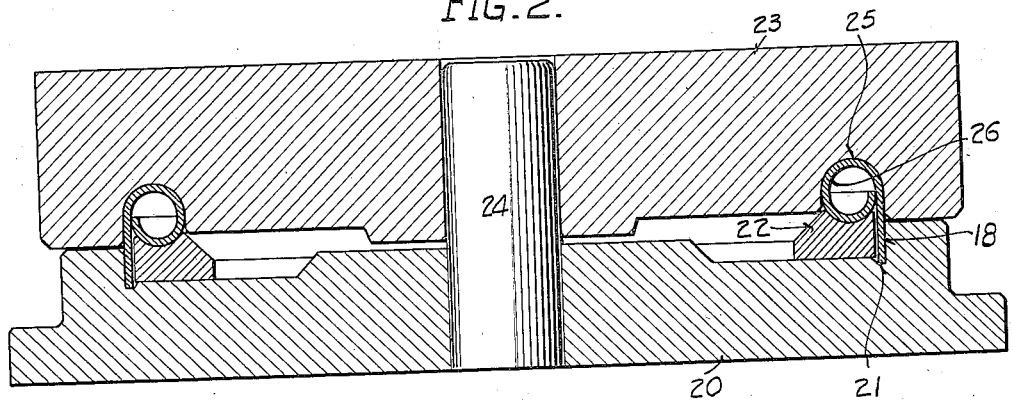
Fig. 2 is a view in vertical section of the press after the first operation has been completed, showing the first step in the fabrication of the chime.

When the upper press member is actuated downwardly, the upper end of the blank 18 is projected into the groove 25 and, as the pressing operation proceeds, the upper end of the blank 18 is rolled inwardly and downwardly to the form shown in Fig. 2. The blank as partially shaped includes the cylindrical shell portion 10 and a hollow ring 26. The hollow ring is now ready for the second operation.

The press utilized for performing the second operation comprises an upper press member 27 carrying a clamping ring 28. The clamping ring is disposed on a plurality of bolt screws 29 depending from the press block 27. The clamping ring 28 is biased away from the press block 27 by springs 30.

The upper press member has a depending annular projection 31, the inner lower corner of which is cut away on a curve as shown at 32. The internal diameter of the leading end of the projection 31 is large enough to fit over the upper outer edge of the blank 18.

The lower press member 33 is provided with a guide pin 34 which slides in an opening 35 provided in the upper press member 27 and serves to guide the movements of the latter. The lower press member has a circular groove 36 provided in its upper face for receiving the hollow ring 26 provided on the blank 18 after it has been through the first operation. This groove is shaped to conform to the contour it is desired to give to the bottom of the chime. As illustrated, the bottom is substantially straight with the side walls slightly curved.

The clamping ring 28 is provided with a circumferential groove 37 which is shaped to conform to the contour it is desired to give to the upper portion of the foot of the chime. The groove is curved on the inner side to cooperate with the groove 36 provided in the lower press member to form a nicely curved bead or hand grip 13. The bottom of the clamping ring encircling the groove is flat to form the reenforcing member 15.

Figure 1:
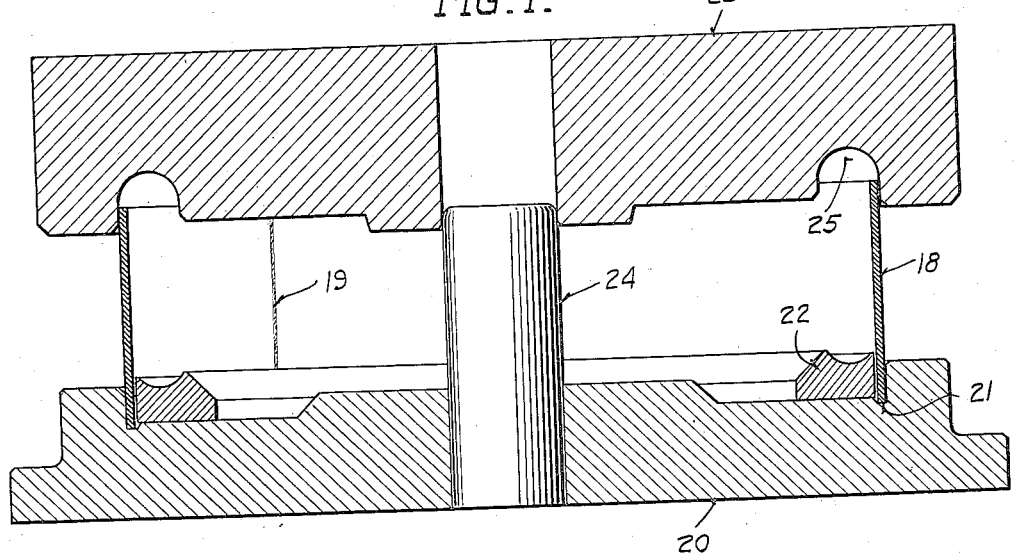
Figure 1 is a view in vertical section of a press showing a chime blank in position ready to start fabrication in accordance with the method of this invention.

No actuating mechanism is shown for operating the press since, as stated in connection with the press illustrated in Figs. 1 and 2, such operating mechanism is well known in the art and it is considered unnecessary to show and describe it.

In the second operation, the partially fabricated chime is placed in the groove 36 provided in the lower press member 33. The clamping ring 28 which leads the upper press member or punch 27 engages the hollow ring portion of the blank and retains it in a predetermined position. As the upper press member 27 progresses downwardly, the projection 31 fits over the upper cylindrical shell of the partially formed chime and reduces it in diameter to a predetermined size and cooperates with the groove 36 provided in the lower press member to form the outwardly extending bead 12. The upper edge of the shell is forced between the periphery of the ring 28 and the inner surface of the projection 31, the respective diameter of these elements being such as to provide an annular space 38 for receiving the shell 10.

As the upper press member moves downwardly, it engages the clamping ring 28 and presses it downwardly, collapsing the hollow ring 26. The ring is forced to conform to the contour of the groove 36 in the lower die member and the groove 37 in the clamping ring. In this manner the curved inwardly extending hand grip bead 13 is given a smooth rounded shape suitable for handling, and the reenforcing member 15 is pressed into engagement with the neck or annular plate 14 to reenforce it.

From the foregoing it will be seen that a strong efficient chime may be fabricated in two operations. It is preferred to work the metal cold and very excellent results have been obtained from this cold working.

The drain holes 16 may be punched in the cylindrical shell portion 10 in any well known manner common in the art. The chime thus fabricated may readily be fitted over the end of the barrel body 11 and attached thereto by welding as shown at 17. The rim of the barrel body seats on the reenforcing plate 15.

Since numerous changes may be made in the above described structure and different embodiments of the invention may be made without departing from the spirit and scope thereof, it is intended that all matter contained in the above description or shown in the accompanying drawings shall be interpreted as illustrative and not in a limiting sense.

I claim:

1. A chime for barrels comprising, in combination, a cylindrical shell portion for attaching to a barrel body, oppositely disposed beads carried by the shell portion at one end and extending circumferentially thereof, the beads lying in a plane substantially normal to the shell portion, and a neck between the beads forming a seat for the body of the barrel.

2. A chime for barrels comprising, in combination, a cylindrical shell portion for attaching to a barrel body, oppositely disposed beads carried by the shell portion at one end and extending circumferentially thereof, the beads lying in a plane substantially normal to the shell portion and extending beyond the shell portion on opposite sides, and a neck extending between the beads forming a seat for the body of the barrel, the seat serving to reenforce the beads.

3. A chime for barrels having metallic bodies comprising, in combination, a cylindrical shell portion for receiving an end of the body of the barrel, oppositely disposed beads carried by the shell portion at one end and extending circumferentially thereof, the beads being disposed on opposite sides of the shell portion and lying in a plane substantially normal to the shell portion, a neck extending between the beads, and a reenforcement disposed over the neck, the neck and reenforcement serving as a seat to receive the end of the barrel body, the outer bead serving as a bumper while the inner bead serves as a hand grip.

4. A chime for barrels having a metallic body comprising, in combination, a cylindrical shell portion for receiving an end of the barrel body, a bumper bead extending outwardly from the shell portion, a hand grip bead carried by the outer bead and extending inwardly, a neck extending between the beads supporting the hand grip bead, and a reenforcement integral with said second bead and disposed adjacent the neck, the neck, the bead forming the hand grip and the reenforcement all being disposed to support the bumper bead, the reenforcement being disposed to support an end of the barrel body.

5. A chime for barrels provided with rigid bodies comprising, in combination, a cylindrical portion for attaching to a barrel body, an outwardly extending circumferential bead carried by the cylindrical portion, a second bead carried by the first bead and spaced therefrom, a neck disposed between the beads for carrying the second bead and serving as a seat for an end of the barrel body.

6. A chime for barrels having body members comprising, in combination, a cylindrical rim for attaching to a barrel body, an outwardly circumferentially extending bead formed integral with the rim to serve as a bumper, an inwardly extending neck carried by the bead, a circumferential hand grip portion formed integral with the neck and cooperative to support the bumper bead, and a reenforcement formed integral with the hand grip bead and lying adjacent the neck forming a seat for the end of the barrel body.

7. A chime for barrels having body members comprising, in combination, a hoop-shaped member for fitting over the end of a barrel, a bead carried by the lower end of the hoop-shaped member, the bead extending outwardly beyond the hoop-shaped member, a neck simulating an annular plate extending inwardly from the bead in a plane substantially normal to the hoop-shaped member, a hand grip bead formed on the inner edge of the annular plate, and a reenforcement carried by the inner bead and lying upon the annular plate providing a seat for receiving the end of the barrel body.

8. In combination in a barrel, a substantially cylindrical sheet metal end skirt extending longitudinally of the barrel at its outer circumference for protecting the barrel from injury, and a sheet metal chime having a sleeve encircling said skirt and a bead at the outer end of said sleeve merging into a flat ring plate-like member, the inner edge of which is folded in a return bend extending between the flat ring and the end of the skirt and engaging each to transmit shock directly to the skirt.

WILLIAM R. KEPLER.